(12) United States Patent
Kellerman et al.

(10) Patent No.: US 8,656,443 B2
(45) Date of Patent: Feb. 18, 2014

(54) METHOD AND SYSTEM FOR PROVIDING DYNAMIC TIME SLICE ENCODING FOR COMPLETE INTERNET ANYWHERE

(75) Inventors: Marcus Kellerman, San Diego, CA (US); Xuemin Chen, Rancho Santa Fe, CA (US); Vladimir Silyaev, Laguna Niguel, CA (US); David Erickson, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 851 days.

(21) Appl. No.: 12/649,971

(22) Filed: Dec. 30, 2009

(65) Prior Publication Data

US 2011/0162025 A1   Jun. 30, 2011

Related U.S. Application Data

(60) Provisional application No. 61/261,780, filed on Nov. 17, 2009.

(51) Int. Cl.
*H04N 7/173* (2011.01)
(52) U.S. Cl.
USPC ........... 725/116; 725/105; 725/106; 725/107; 725/108; 725/109; 725/131
(58) Field of Classification Search
USPC ................................. 725/105–109, 116, 131
See application file for complete search history.

(56) References Cited

U.S. PATENT DOCUMENTS

| | | | | |
|---|---|---|---|---|
| 6,397,258 B1* | 5/2002 | Tsuji et al. | ..................... | 709/233 |
| 7,954,131 B2* | 5/2011 | Cholas et al. | ................. | 725/112 |
| 2004/0255326 A1* | 12/2004 | Hicks et al. | ................... | 725/112 |
| 2011/0067080 A1* | 3/2011 | Riha | ............................. | 725/110 |
| 2011/0154383 A1* | 6/2011 | Hao et al. | .......................... | 725/8 |

* cited by examiner

*Primary Examiner* — Pankaj Kumar
*Assistant Examiner* — Charles N Hicks
(74) *Attorney, Agent, or Firm* — Thomas Horstemeyer, LLP

(57) ABSTRACT

A server may be used to handle at least some of processing of content retrieved via and/or derived from Internet access operations of a plurality of set-top boxes (STBs). Resource allocation and/or utilization, and/or tasks or applications performed in the server during the processing may be configured based on control data, which may be determined by the server and which may comprise capabilities of links between the server and each of the plurality of STBs, requirements of the tasks, characteristics of the content and/or the Internet access operations, user preferences and/or interactions, and/or content provider preferences. The server may dynamically reconfigure the tasks and/or resources based on monitoring of its operations and/or changes of the control data. Configuring tasks and/or resources may comprise time slicing access to resources that are commonly used during concurrent servicing of at least some of the plurality of STBs by the support server.

20 Claims, 5 Drawing Sheets

METHOD AND SYSTEM FOR PROVIDING DYNAMIC TIME SLICE ENCODING FOR COMPLETE INTERNET ANYWHERE

CROSS-REFERENCE TO RELATED APPLICATIONS/INCORPORATION BY REFERENCE

This patent application makes reference to, claims priority to and claims benefit from U.S. Provisional Patent Application Ser. No. 61/261,780, filed Nov. 17, 2009. This application also makes reference to:

U.S. patent application Ser. No. 12/650,145 filed on Dec. 30, 2009;
U.S. patent application Ser. No. 12/650,141 filed on Dec. 30, 2009;
U.S. patent application Ser. No. 12/650,140 filed on Dec. 30, 2009;
U.S. patent application Ser. No. 12/650,069 filed on Dec. 30, 2009;
U.S. patent application Ser. No. 12/650,067 filed on Dec. 30, 2009;
U.S. patent application Ser. No. 12/650,020 filed on Dec. 30, 2009;
U.S. patent application Ser. No. 12/650,171 filed on Dec. 30, 2009; and
U.S. patent application Ser. No. 12/649,998 filed on Dec. 30, 2009.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to networking. More specifically, certain embodiments of the invention relate to a method and system for providing dynamic time slice encoding for complete internet anywhere.

BACKGROUND OF THE INVENTION

With the continuous growth of on-line businesses, social networks, and other on-line services and applications, a user may want a larger number of places or locations from which to access the Internet in a manner that is flexible and/or suits the user's lifestyle. Most users currently connect to the Internet using a web browser running on a personal computer. While only a portion of homes have a computer, most homes have a television, and in many instances, multiple televisions. Therefore, rather than using a computer to access the Internet, a user may find it more convenient to use the flat screen televisions and/or monitors in homes for the same purpose. To do so, a set-top-box (STB) connected to, for example, a flat screen television may be provided with web browsing software and protocols, and Internet connectivity, which may enable the user to easily access the Internet or check their electronic mail (email), for example, from a convenient and comfortable location such as their living room.

There may be instances, however, in which the STB may not be configured to support and/or capable of processing certain content in a web page. Moreover, there may be instances in which the latency associated with rendering or displaying certain content in a web page may be long because of the processing capabilities of the STB. This may affect the overall experience of the user.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for dynamic time slice encoding for complete internet anywhere, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for providing dynamic time slice encoding for complete internet anywhere. In various embodiments of the invention, a server may be used to handle at least some of processing of content retrieved via and/or based on Internet access operations in a plurality of set-top boxes (STBs). Resource allocation or utilization, and/or applications or tasks performed in the server during the processing may be configured based on control data, which may be determined by the server. The control data may comprise capabilities of links between the server and each of the plurality of STBs, requirements of the tasks necessary for performing the processing, characteristics of content and/or the Internet access operations, user preferences and/or interactions, and/or content provider preferences. In this regard, link capabilities may comprise bandwidth available during communication of processed content from the server to each of the STBs. The processing may comprise converting content that is unsupported via the plurality of STBs to supported content, which may comprise video, audio, and/or graphics content. Configuring tasks and/or resources may comprise time slicing access to resources that are commonly used during concurrent servicing of at least some of the plurality of STBs by the support server. Configuring tasks and/or resources may also enable balancing load of the server during concurrent content processing for at least some of the plurality of STBs based on capabilities of links between the server and each of the at least some of the plurality of STBs. The configuration may be performed based on capacities of links between the server and one or more web servers and/or provider head-ends that are utilized to provide the retrieved content and/or to support the Internet access operations. The server may dynamically reconfigure the tasks and/or resources based on monitoring of its operations and/or changes of the control data.

Figure 1A:
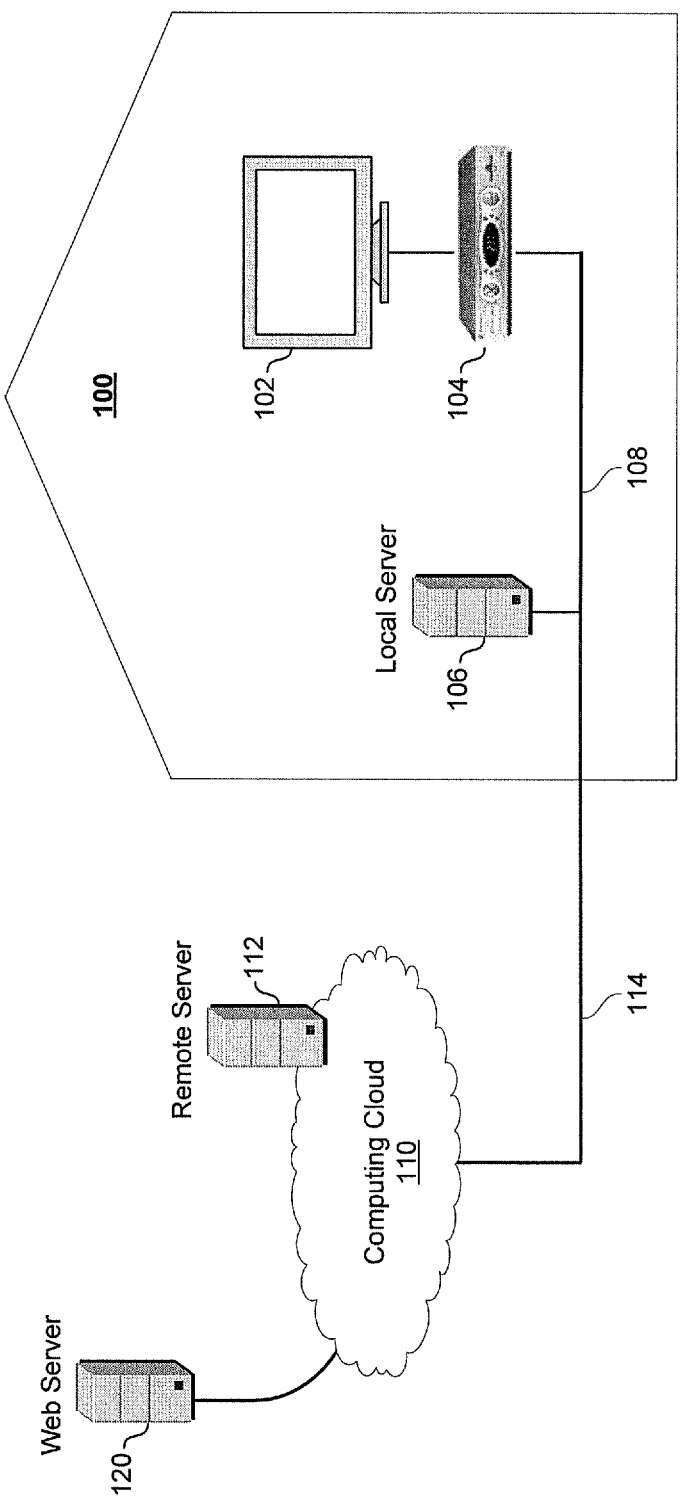
FIG. 1A is a block diagram illustrating an exemplary system that provides offloaded servicing by support servers during web access via a set-top-box (STB), in accordance with an embodiment of the invention.

FIG. 1A is a block diagram illustrating an exemplary system that provides offloaded servicing by support servers during web access via a set-top-box (STB), in accordance with an embodiment of the invention. Referring to FIG. 1A, there is shown a location 100 within which may be disposed a television 102, an STB 104, a local support local server 106, and a broadband connection 108. Also shown in FIG. 1A is a computing cloud 110, which may coupled to the location 100 via a broadband connection 114, and a web server 120.

The location 100 may be a residence (e.g. home or apartment), a business, a school, a library, and/or other like setting in which a user may want to access the Internet and/or check their electronic mail (email). The position or placement of the television set 102, the STB 104, and/or the local support local server 106 within the location 100 may be based on user convenience and/or lifestyle. For example, when location 100 is a residence, the television set 102 and the STB 104 may be located in a bedroom, a family room, or an entertainment room. In another example, when location 100 is a business or a public building, the television set 102 and the STB 104 may be located in a conference room. The local support local server 106 may be located nearby (for example, in the same room) the television set 102 and the STB 104 or may be located remotely (for example, in another room or nearby building) from the television set 102 and the STB 104. The broadband connection 108 may provide a wired connection that communicatively couples two or more devices within the location 100 utilizing, for example, coaxial cables. In addition to wired connectivity, a portion of the broadband connection 108 may also provide wireless connectivity between two or more devices within the location 100, utilizing, for example, WiFi links.

The television set 102 may comprise suitable logic, circuitry, code, and/or interfaces that may be operable to receive signals from which to display images (for example, moving images) that are typically accompanied by sound. The television 100 may be based on, for example, cathode ray tube (CRT) technology, plasma technology, liquid crystal display (LCD) technology, and/or light emitting diode (LED) backlit LCD technology. The television set 102 may be operable to support one or multiple technical standards such as digital television (DTV) and high-definition television (HDTV), for example. The resolution of the screen or display portion of the television set 102 may be based on the technical standard supported by the television set 102. For example, for HDTV, the resolution of the screen may be 720p, 1080i, or 1080p, where the numeral indicates the vertical resolution of the screen, the letter "p" refers to progressive-scan format, and the letter "i" refers to interlaced-scan format.

The STB 104 may comprise suitable logic, circuitry, code, and/or interfaces that may be operable to connect the television set 102 to an external source of signals, and/or may be operable to convert those signals into content that may be displayed, for example, by the television set 102. The STB 104 may also be operable to provide processing associated with managing, delivering, and/or storing content that may be displayed on the television set 102, wherein that content may comprise video, audio, and/or graphics content. In an exemplary aspect of the invention, the STB 104 may be operable to run a web browser that may be displayed on the screen of the television set 102, for user interaction. A web browser is typically a software application that may enable a user to retrieve, present, or review information resources available on, for example, the World Wide Web ("the Web"). An information resource may comprise a web page, an image, video, text, graphics, and/or other type of multimedia content, for example. A web browser may also be utilized to access information that is provided by web servers in private networks and/or files in file systems. Examples of web browsers may comprise Internet Explorer, Mozilla Firefox, Apple Safari, Google Chrome, Opera, and/or browsers that may be native or custom-made for the STB 104.

Information resources may be brought to the user via the web browser when the user inputs a Uniform Resource Identifier (URI) into the web browser. In this regard, the prefix of the URI may be utilized to determine how to interpret the URI. For example, a URI that starts with "http:" may identify a resource to be retrieved over Hypertext Transfer Protocol (HTTP). Other prefixes that may be supported include "https:" for HTTP Secure (HTTPS), "ftp:" for the File Transfer Protocol (FTP), and "file:" for local files, for example. A Uniform Resource Locator (URL) is typically a subset of the URI that specifies the location where an information resource is available for retrieval and/or the mechanism for retrieval. Once the information resource has been retrieved, the web browser may be operable to display it. For example, HyperText Markup Language (HTML) may be passed to a layout engine in the web browser to be transformed from markup representation to an interactive document. In addition to HTML, web browsers may display different types of content on a web page. For example, web browsers may display images, audio, video, and/or Extensible Markup Language (XML) files, and often comprise and/or support certain plug-ins for, for example, Flash applications and/or Java applets. In one embodiment of the invention, in instances when a file of an unsupported type or a file that is set up to be downloaded rather than displayed is encountered, the browser may prompt the user to save the file to fixed and/or removable memory storage, for example, a memory in the set-top-box. In another embodiment of the invention, the web browser may present one or more requests to the local support local server 106 or to a server in the computing cloud 110 to assist with handling at least a portion of the unsupported content.

The local support local server 106 may comprise suitable logic, circuitry, code, and/or interfaces that may be operable support at least some of the processing otherwise required by the STB 104. In this regard, the local support local server 106 may run and/or execute certain software applications that may be accessible from the STB 104 via the broadband connection 108. For example, the local support local server 106 may be operable to provide support to the web browsing operations provided by the STB 104. The local support local server 106 may be implemented in a computing device, comprising for example a personal computer, laptop, tablet; and/or or in a networking device, comprising for example, a router, which may provide processing capabilities that are sufficient for performing particular software applications. For example, in instances when the local support local server 106 is utilized to support web browsing operations in the STB 104, the processing capabilities in the local support local server 106 may be sufficient to run or execute software applications that provide such support.

The computing cloud 110 may comprise a plurality of servers and/or computing devices associated with providing various services offered by the Internet. In this regard, the term 'cloud' typically refers to the Internet and is based on the graphical depiction of the Internet as a cloud in computer network diagrams to represent the underlying infrastructure of the Internet. The servers in the computing cloud 110 may be utilized to provide reliable services that may be delivered through individual servers and/or data centers, for example. The computing cloud 110 may appear, to a user or to a location (for example, location 100), as a single point of access to services and/or resources that may be provided by the computing cloud 110. The servers in the computing cloud 110 may comprise, for example, applications servers that may be dedicated to running certain software applications and/or web servers (e.g. the web server 120) to which HTTP clients may connect to send commands and receive responses along with data content. For example, a remote server 112, in the computing cloud 110 may be utilized to support web browsing operations in the STB 104, performing substantially similar tasks and/or services that otherwise performed by the local server 106. In such instances, the remote server 112 in the computing cloud 110 may have processing capabilities sufficient to run or execute software applications that provide such support.

The server 112 may also be referred to as a render server or an STB assistance server, for example, to indicate that the remote server 112 may be operable to assist the STB 104 to render web content. Whether the remote server 112 in the computing cloud 110 or the local server 106 is utilized to support web browsing operations in the STB 104 may depend, at least in part, on the amount of latency that may be acceptable to a user when having web browsing operations in the STB 104, such as the rendering of a web page, for example, be supported or assisted by another resource. In this regard, a local resource (for example, the local server 106) may have lower latency than a remote resource (for example, the remote server 112 in computing cloud 110). Whether the remote server 112 in the computing cloud 110 or the local server 106 is utilized to support web browsing operations in the STB 104 may also depend on, for example, availability of the local server 106, available resources on the local server 106, and/or the processing capabilities and the type of support that may be provided by the remote server 112.

The web server 120 may comprise suitable logic, circuitry, code, and/or interfaces that may be operable to deliver to a client (for example, the STB 104) web pages (for example, HTML documents) and associated content (for example, images, style sheets, JavaScripts). When a client requests a specific information resource using HTTP, the web server 120 may respond by providing the content associated with that information resource. A full implementation of HTTP may enable the web server 120 to receive content from a client.

In operation, a user may decide to access a web page via a web browser in the STB 104 that is being displayed in the television set 102 while comfortably sitting in his/her living room. The user may submit a URL to the web browser, which in turn sends a request for the information resource associated with that URL to a web server, such as the web server 120. The web server 120 may pass the HTML and/or related content or information associated with the URL to the STB 104. The STB 104 may perform a pre-fetch operation of the web page information provided by the web server 120 to determine the type of content (for example, supported or unsupported content) that is comprised within the web page. The STB 104 may be operable to perform the pre-fetch operation as a background process, for example. For example, the web browser in the STB 104 may not be capable of providing support for certain content (for example, binary plug-ins) because such content is not native to the processor being utilized in the STB 104. For example, plug-ins that have been developed or coded for execution in an x86-based processor architecture may not be supported in a STB having a processor based on a Microprocessor without Interlocked Pipeline Stages (MIPS) architecture. In such instances, changing the set-top-box design and/or providing an emulator of the x86-based processor in the set-top-box may be prohibitive.

In instances when certain portions of the web page may not be supported by the web browser provided in the STB 104, the STB 104 may send one or more requests to a server that is operable to provide web browsing support to the STB 104. The unsupported portions may comprise, for example, sections requiring a plug-in. In this regard, the STB 104 may send requests via an upper link to the local server 106 and/or to the remote server 112 in the computing cloud 110. The request may comprise information regarding the URL associated with the unsupported content, the size of the unsupported content in the web browser, and/or events associated with the unsupported content. Once such information is received by the server providing web browsing support to the STB 104, the server may in turn request and obtain the unsupported content from the corresponding web server 120, may process the unsupported content, and may encode the processed content into a format that may be received by the STB 104. In one exemplary embodiment of the invention, the processed content may be encoded with a low latency encoder protocol such as H.264/Advanced Audio Coding (ACC). In this regard, the server providing web browsing support to the STB 104 may be operable to transcode or provide direct conversion from one encoding format to another encoding format. The transcoding may comprise changing the bitstream format of one file to another bitstream format without undergoing a decoding and re-encoding process.

The resulting audio and video (A/V) content produced at the server may then be streamed to the STB 104, which in turn decodes the A/V stream and renders the resulting information in the appropriate portion of the web page to composite the complete web page. The portions of the web page that are supported by the web browser in the STB 104 may be rendered before or concurrently with the information provided by the server. In other words, the data provided by the server may be sent to the STB 104 when needed to composite the complete page according to a predetermined approach or scheme. Once the user moves away from that particular web page, the server may terminate the jobs related to that web page.

The STB 104 may also be operable to have all web page content handled by server(s) providing web browsing support to the STB 104. In such embodiments, the support server(s) may receive the URL information associated with the web page from the STB 104 and may in turn request the contents of the web page from the web server 120. The server may then encode the information in a format that may be received by the STB 104 and may stream the A/V content to the STB 104 to composite the complete web page. Although the STB 104 with a broadband connection capability is illustrated in FIG. 1A for full internet experience, the invention may not be so limited. Accordingly, instead of the STB 104, the television set 102 itself with a broadband connection capability for full Internet experience may be supported without departing from the spirit and scope of various embodiments of the invention.

In an exemplary aspect of the invention, a support server that is used to service an STB may be operable to service a plurality of STBs at the same time. In this regard, the support server(s) may be operable to handle multiple concurrent request to provide content processing for the serviced STBs. The servers, however, may comprise limited number physical resources, such as hardware resources providing codec operations. Consequently, certain techniques may be utilized in the supporting severs to optimize their operations such that the total number of serviced STBs and/or quality of content processed via the supporting servers may be increased.

In various embodiments of the invention, adaptive processing and/or control techniques may be used to adjust and/or improve resource allocation and/or application configuration in a support server, such as the local server 106 or the remote server 112, during concurrent servicing of multiple STBs. In this regard, the support servers may determine configuration related data that may affect resources, processes, and/or applications utilized during servicing of STBs. Exemplary configuration related data may comprise link bandwidth of connections utilized to communicate processed content from the servers to the serviced STBs. The configuration data may then be utilized to improve operations of the servers during servicing of the STBs. For example, the configuration related information may be utilized, via a scheduling algorithm for example, to determine how to allocate hardware resources in the servers during servicing of the STBs, by using time slicing techniques, for example, such that access to particular resources may controlled using time slots that are allocated variably among processes corresponding to serviced STBs.

The configuration related data may also be utilized, for example, for adaptive processing. In this regard, processes, applications, and/or tasks performed via the support server to enable servicing each of the STBs may be variably adjusted based on the configuration related information. For example, in instances when available bandwidth of link between the supporting server and serviced STB may be low, web page processing performed via the support server may be adjusted to utilize area based updates, wherein only parts that change in sequence of processed web pages (e.g. to simulate plug-in playback) are updated to lower the required overall bandwidth during transmittal of the processed content. In some embodiments of the invention, the support server may continually monitor parameters and/or conditions that may affect STB servicing related operations to enable dynamic reconfiguration of its resources, processes, and/or applications.

In some embodiments of the inventions, support servers that are concurrently servicing multiple STBs may communicate to enable sharing their resources during STB servicing operations. For example, the local server 106 and the remote server 112 may communicate, via the broadband connection 114 and the computing cloud 110, to enable sharing at least some of their resources during concurrent STB servicing operations by the local server 106 and the remote server 112.

Figure 1B:
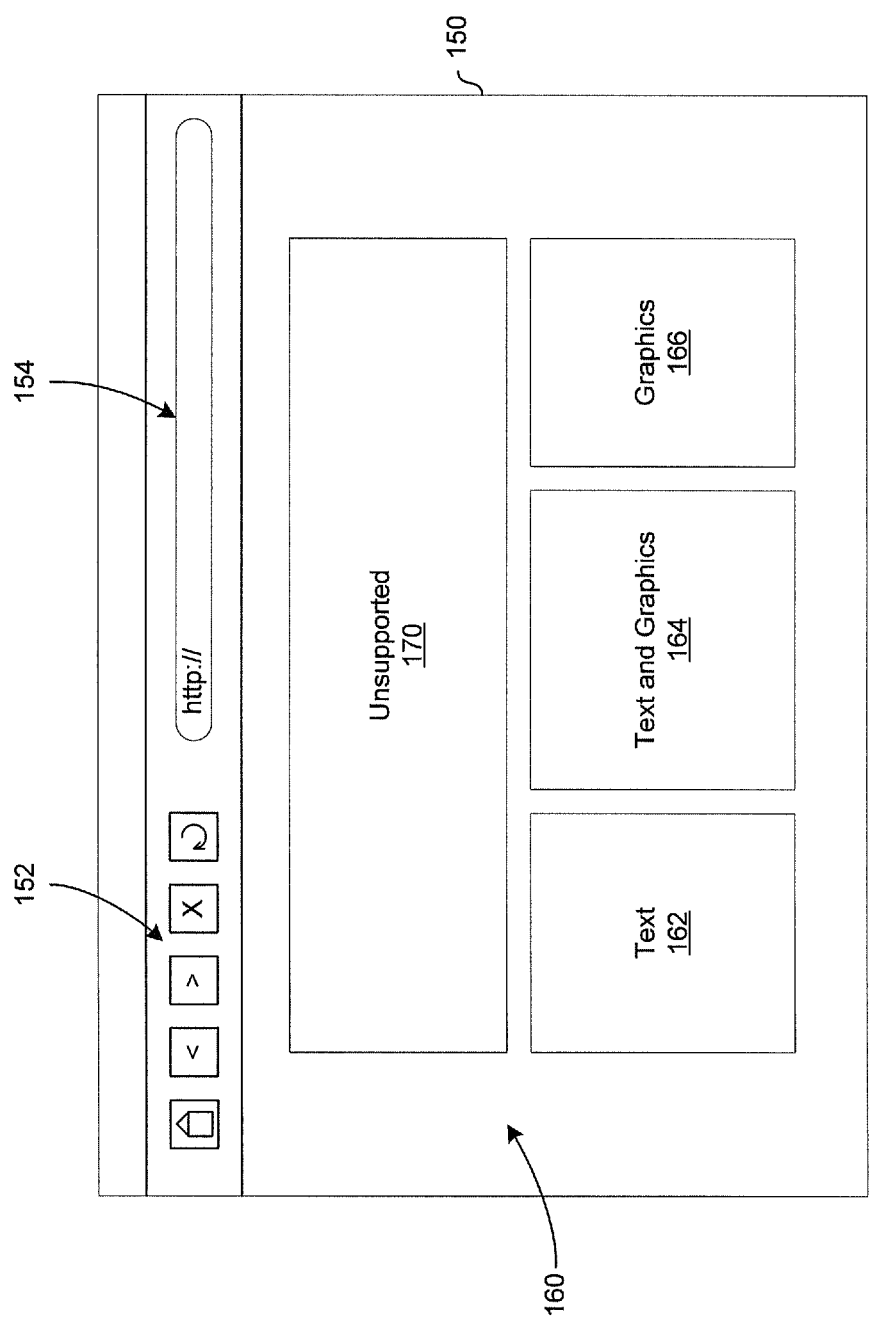
FIG. 1B is a block diagram illustrating an exemplary web page with multiple content types that is to be displayed by a local web browser in a set-top-box (STB), in accordance with an embodiment of the invention.

FIG. 1B is a block diagram illustrating an exemplary web page with multiple content types that is to be displayed by a local web browser in a set-top-box (STB), in accordance with an embodiment of the invention. Referring to FIG. 1B, there is shown a web browser 150 in which a web page 160 is to be displayed or rendered. The web browser 150 may comprise certain user interface elements 152 (for example, back, forward, reload, stop, home) that may be utilized for navigation and/or operation, and an address bar 154 that may be utilized to submit a URI.

The web page 160 to be displayed in the web browser 150 may comprise different types of contents. In the example illustrated in FIG. 1B, the web page 160 may comprise a text portion 162, a text and graphics portion 164, a graphics portion 166, and an unsupported (for example, plug-ins) portion 170. When the STB performs a pre-fetch operation to determine the types of content in the web page, it may determine that the unsupported portion 170 may be a portion of the web page for which the STB may need support from a sever. In this regard, the STB may identify the unsupported portion 170 to a server via a request for assistance. The server may then process the unsupported portion 170 and may subsequently provide the processed content associated with the unsupported portion 170 back to the STB in a format that the STB may utilize to composite the web page 160 in the web browser 150.

Figure 2:
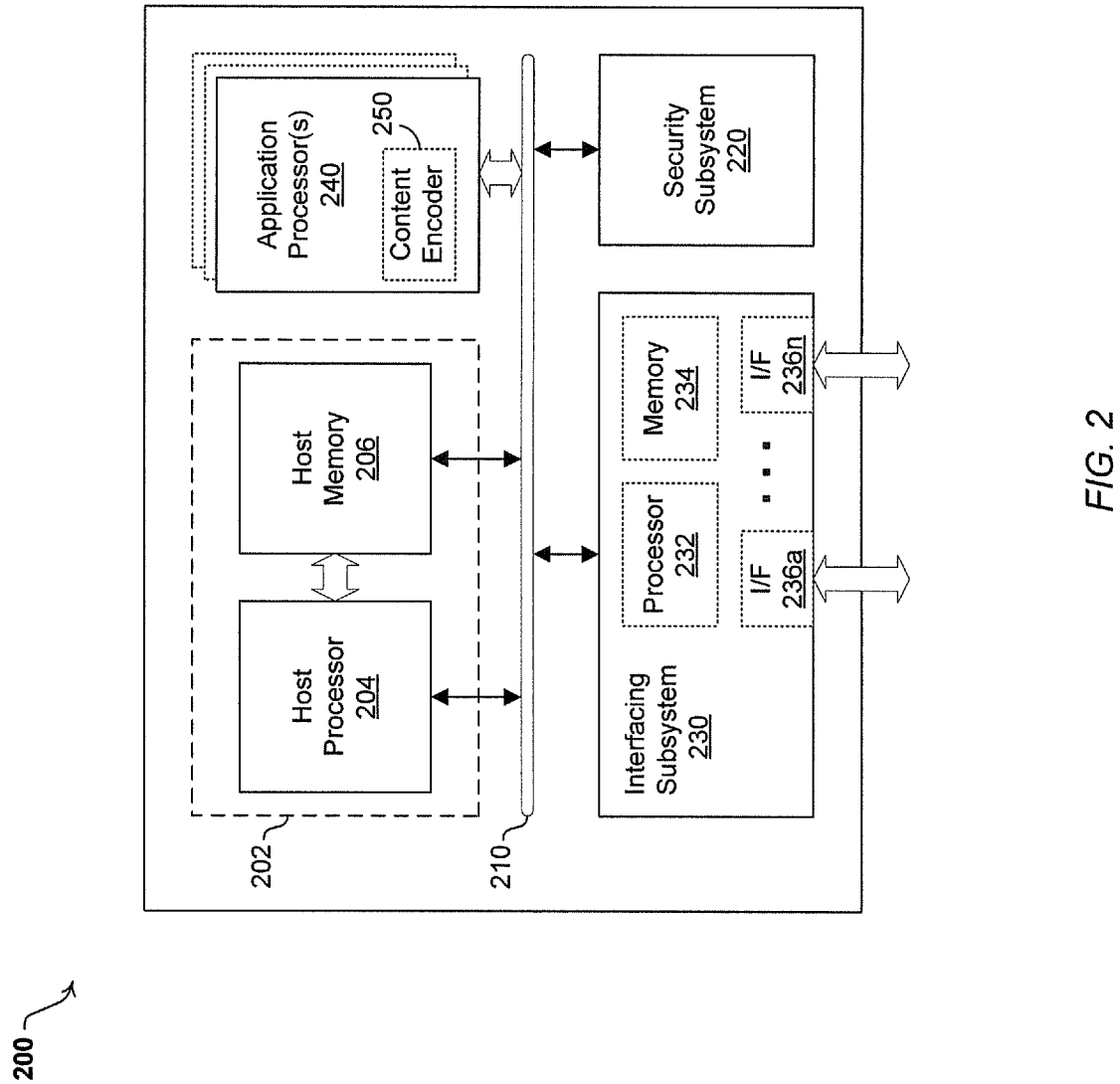
FIG. 2 is a block diagram illustrating an exemplary server that supports web browsing in set-top-boxes (STBs), in accordance with an embodiment of the invention.

FIG. 2 is a block diagram illustrating an exemplary server that supports web browsing in set-top-boxes (STBs), in accordance with an embodiment of the invention. Referring to FIG. 2, there is shown a server 200, a host system 202, a host processor 204, a host memory 206, a system bus 210, a security system 220, an interfacing system 230, an interfacing processor 232, an interfacing memory 234, a plurality of UF modules 136a, . . . , 136n, and application processor 240.

The server 200 may comprise suitable logic, circuitry, code, and/or interfaces that may be operable to support web browsing operations external to set-top boxes (STBs). For example, the server 200 may correspond to the local server 106 and/or the remote server 112 of FIG. 1A, each of which may support web browsing operations for the STB 104. The server 200 may comprise, for example, the host system 202, the system bus 210, the security system 120, and/or the interfacing system 230.

The host system 202 may comprise suitable logic, circuitry, code, and/or interfaces that may be operable to control and/or manage operations of the server 200 and/or tasks or applications performed therein. The host system may comprise, for example, the host processor 204 and/or the host memory 206. The host processor 204 may comprise suitable logic, circuitry, interfaces and/or code that may be operable to process data and/or control operations of the server 200. In this regard, the host processor 204 may be operable to configure and/or control operations of various components and/or or systems of the server 200, by providing, for example, control signals. The host processor 204 may also control data transfers within the server 200, during web browsing support operations, for example. The host memory 206 may comprise suitable logic, circuitry, interfaces and/or code that enable permanent and/or non-permanent storage and/or fetching of data, code and/or other information used in the server 200. In this regard, the host memory 206 may comprise different memory technologies, including, for example, read-only memory (ROM), random access memory (RAM), and/or Flash memory. The host memory 206 may store, for example, information comprising configuration data used during web browsing support operations in the server 200. The configuration data may comprise parameters and/or code, which may comprise software and/or firmware, but the configuration data need not be limited in this regard. The host processor 204 may enable execution of applications, programs and/or code, which may be stored in the host memory 206 for example, to enable performing various web browsing support operations.

The system bus 210 may comprise suitable logic, circuitry, code, and/or interfaces that may enable exchange of data and/or information between various components and/or systems in the server 200. In this regard, the system bus may comprise different parallel or serial, and/or internal or external, based bus technologies, and/or any combinations thereof. Exemplary system bus interfaces may comprise Inter-Integrated Circuit (I²C), Universal Serial Bus (USB), Advanced Technology Attachment (ATA), Small Computer System Interface (SCSI), Peripheral Component Interconnect (PCI), and/or Peripheral Component Interconnect Express (PCI-e) based interfaces.

The security system 220 may comprise suitable logic, circuitry, code, and/or interfaces that may perform security related operations in the server 200. In this regard, the security system 220 may ensure secured communications between the server 200 and serviced STBs by providing, for example, user authentication, certificate usage, and/or cryptographic operations.

The interfacing system 230 may comprise suitable logic, circuitry, code, and/or interfaces that may enable communication of data, content, and/or messaging from and/or to the server 200. The interfacing system 230 may support, for example, a plurality of physical and/or logical connections or interfaces. In this regard, the interfacing system 230 may comprise, for example, one or more network interface cards (NIC) and/or wireless network interface cards (WNIC), to support use of wired and/or wireless connections. The interfacing system 230 may comprise, for example, the interfacing processor 232, the interfacing memory 234, and/or the plurality of I/F modules 136a, . . . , 136n.

The interfacing processor 232 may comprise suitable logic, circuitry, code, and/or interfaces that may enable dedicated control and/or management of processing and/or operations in the interfacing system 230. The interfacing memory 234 may comprise suitable logic, circuitry, and/or code that may enable dedicated storage via the interfacing system 230, to enable, for example, buffering content transmitted to STBs. The interfacing memory 234 may comprise one or more ROM and/or RAM memory devices. Each of the of I/F modules 136a, . . . , 136n may comprise suitable logic, circuitry, code, and/or interfaces that may enable physical transmission and/or reception based on a wired-based or wireless protocols.

The application processor 240 may comprise suitable logic, circuitry, code, and/or interfaces that may be operable to perform specific applications and/or tasks in the server 200 during STB servicing operations. For example, the application processor 240 may process requests from STBs to handle at least a portion of the content of a web page for subsequent rendering by the STBs. In this regard, the application processor 240 may be operable to convert and/or transcode content from one format into another format, using, for example, a content encoder 250. The content encoder 250 may comprise suitable circuitry, logic, code, and/or interfaces that may be operable to transform data processed by the application processor 240 into format supported by serviced STBs. For example, the application processor 240 may be operable to process plug-ins unsupported by the web browser in the STB 120 and may encode such processed plug-ins with a low latency H.264/ACC encoder. The application processor 240 may comprise a plurality of different encoders that may be utilized to encode different types of contents from a web page into different formats, for example. In some embodiments of invention, the server 200 may comprise a plurality of application processors 240, as indicated by the dashed outlines illustrated in FIG. 2, to enable performing multiple applications and/or tasks concurrently. Accordingly, the server 200 may be operable to support a plurality of STBs, and/or may be operable to provide load balancing and/or load sharing. For example, each of the plurality of application processors 240 may be configured to service a particular STB, to process or handle specific format, and/or perform a specific sub-task that may be necessary during web browsing support operations via the server 200. The application processor 240 may comprise, for example, x86-based architecture that may support processing of certain plug-ins developed or coded for execution in an x86-based processor architecture. The server 200 may also be operable to provide, via the application processor 240, an emulator of the x86-based processor to process certain content unsupported by STBs.

In operation, the server 200 may be utilized to support certain operations in STBs. For example, the server 200 may support web browsing via STBs by providing, via the application processor 240, content processing corresponding to unsupported portions 170 in a web page 160 that may need be rendered via the STBs. The content processing may comprise providing content supported by the STBs, wherein the support content may comprise video, audio, and/or graphics content. In this regard, the server 200 may communicate with STBs, via wired and/or wireless connections, which may be supported via the interfacing system 230. The connectivity between the server 200 and a serviced STB may comprise direct connections, such as the broadband connection 108. Alternatively, the server 200 may connect with serviced STBs indirectly, for example via the computing cloud 110. The interfacing system 230 may also enable interactions between the server 200 and entities from which the content processed via the server 200 is retrieved, such as the web server 120. The security system 230 may provide security during interactions between the server 200 and the serviced STBs and/or web servers, to ensure, for example, that content intended for specific users is not compromised and/or accessed by unauthorized users.

In an exemplary aspect of the invention, the server 200 may be operable to simultaneously or concurrently support a plurality of STBs, providing, for example, concurrent web browsing servicing to the STBs. For example, the server 200 may enable spawning multiple encoding sessions that may correspond to various contents that may be processed via the server 200 during servicing of the multiple STBs. Running these concurrent encoding sessions may require, however, sharing at least some hardware resources and/or applications in the server 200 that are typically utilized during STB servicing operations, such as video codec related resources and/or applications.

In various embodiments of the invention, resources, processes, and/or applications that are used and/or performed in the server 200 during concurrent servicing of a plurality of STBs may be configured and/or dynamically adjusted to optimize operations of the server 200. Accordingly, adaptive processing and/or control techniques may be used to adjust and/or improve resource allocation and/or application configuration in the server 200 during concurrent servicing of multiple STBs. The server 200 may determine, via the host processor 204 for example, configuration related data that may affect resources, processes, and/or applications utilized and/or performed in the server 200 during servicing of the STBs. The configuration data may then be utilized to improve operations of the servers during servicing of the STBs. For example, the host processor 204 may incorporate the configuration related information into a scheduling algorithm that may be utilized to generate control signals. The control signals may configure and/or modify allocation of resources that are used during STB servicing operations in the server 200. For example, the scheduling algorithm may enable sharing and/or load balancing of necessary resources in the server 200 using, for example, time slicing. In this regard, the scheduling algorithm may enable allocation of time slots that may be utilized for servicing different STBs to control access to particular resources that may need be shared during these servicing operations.

The server 200 may also utilize adaptive processing to further enhance STB servicing operations. In this regard, the server 200 may adjusted, via the host processor 204 for example, processes, applications, and/or tasks performed via the server 200 during STB servicing operations. For example, during web page based content processing in the server 200, the encoding sessions utilized in the server 200 may be scalable, such that they may be modified to adjust the size of the corresponding video streams that are generated based on content processing in the server 200. This may enable increasing or decreasing the size of output video stream based on, for example, available bandwidth. Also, localized area and/or page update based processing may be utilized to decrease the size of corresponding video stream based on bandwidth limitation determinations. The server 200 may also continue to monitor conditions that may affect configuration related data, and may reconfigure and/or adjust allocation of resources and/or application, and/or utilization thereof, based on detected changes in such conditions.

Figure 3:
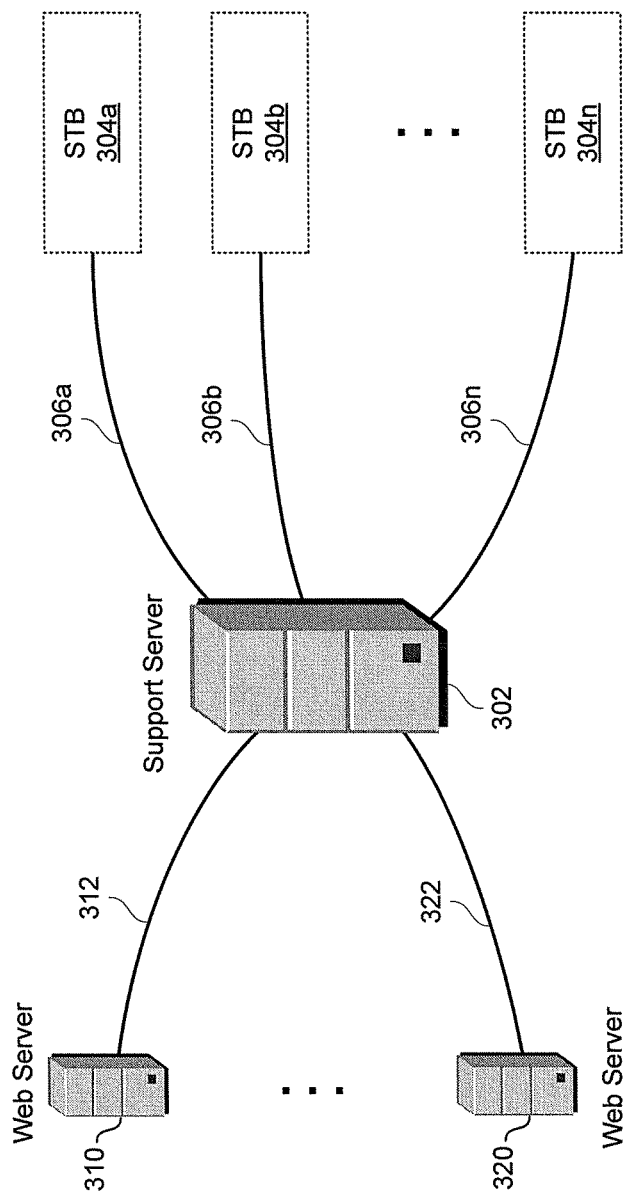
FIG. 3 is a block diagram illustrating an exemplary system comprising a support server servicing a plurality of set-top-boxes (STBs), in accordance with an embodiment of the invention.

FIG. 3 is a block diagram illustrating an exemplary system comprising a support server servicing a plurality of set-top-boxes (STBs), in accordance with an embodiment of the invention. Referring to FIG. 3, there is shown a support server 302, a plurality of STBs 304a, 304b, . . . , 304n, and web servers 310, 320.

The support server 302 may be similar to the server 200, substantially as described with regard to, for example, FIG. 2. Each of the plurality of STBs 304a, 304b, . . . , 304n may be similar to STB 104, substantially as described with regard to, for example, FIG. 1A. Each of the web servers 310, . . . , 320 may be similar to web server 120, substantially as described with regard to, for example, FIG. 1A.

In operation, the support server 302 may concurrently service the plurality of the STBs 304a, 304b, . . . , 304n. In this regard, the support server 302 may support web access via each of the plurality of the STBs 304a, 304b, . . . , 304n by providing complete and/or partial content processing for web pages that are displayed via web browsers in each of the plurality of the STBs 304a, 304b, . . . , 304n. The content processed via the support server 302 may be retrieved from one or more of the web browsers 310, . . . , 320, via links 312, . . . , 322, respectively. The processed content, which be converted to A/V streams in the support server 302; and each of the steams may be transmitted to the corresponding STB in the plurality of the STBs 304a, 304b, . . . , 304n, via the corresponding links 304a, 304b, . . . , 304n.

In an exemplary aspect of the invention, the support server 302 may optimize its servicing operations by configuring its resources, processes, and/or applications based on, for example, configuration related data. The configuration related data may be determined via the support server 302 and/or based on input and/or interactions with users and/or service providers. The configuration related data may comprise, for example, characteristics of links which may be used by the support server 302 to communicate with each of the plurality of the STBs 304a, 304b, . . . , 304n and/or each of the web servers 310, . . . , 320. In this regard, the support server 302 may be operable to determine, for example, the maximum available bandwidth for each of the links 306a, 306b, . . . , 306n between the support server 302 and the each of the plurality of STBs 304a, 304b, . . . , 304n. Similarly, the support server 302 may determine the maximum available bandwidth for each of the links 312, . . . , 322 between the support server 302 and the each of the web server 310, . . . , 320.

The configuration related data may be utilized, by the support server 302, to configure its resources, processes, and/or applications. For example, the support server 302 may determine that the maximum available link bandwidth for links 306a, 306b, and 306n may be 700 kbps, 2 mbps, and 200 kbps, respectively. Accordingly, in allocating its resources, the support server 302 may allocate, using time slicing for example, more access time to commonly utilized resources for processing content that is transmitted to STB 304b since the corresponding link, link 306b, supports higher bandwidth. Similarly, the support server 302 may allocate, using time slicing for example, more access time to commonly utilized resources for processing content that is transmitted to STB 304a than to STB 304n since the corresponding link, link 306a, supports higher bandwidth than link 306n. The support server 302 may also adjust resource allocation and/or load balancing configuration based on capacity of link that is to be used for retrieving the necessary content. For example, in instances when the support server 302 concurrently services STBs 304a and 304b, wherein the necessary content is retrieved from web servers 310 and 320, respectively, the support server may adjust resource sharing based on which of the links 312 and 322 support higher bandwidth.

The support server 302 may also utilize additional configuration-related data. In this regard, priority criteria may be configured via the support server 302 to further adjust its STB servicing operations. For example, in determining its resource allocation and/or balancing its load, the support server 302 may determine type and/or extent of activities in web pages whose content, in whole or part, is processed via the support server 302. In this regard, web pages with certain activities, such as streaming content for example, may be given higher priority over static and/or text-only based web pages. The support server 302 may also account for the type of user interactions or user requests made during serviced web access operations via each of the STBs 304a, 304b, and/or 304n, with regard to particular processed web pages. For example, different priority values may be assigned to clicks or mouse movements. The support server 302 may also enable service provider to specify and/or adjust access and/or servicing priority. For example, a service provider may require that users with premium service be given higher priority than users with regular service.

Figure 4:
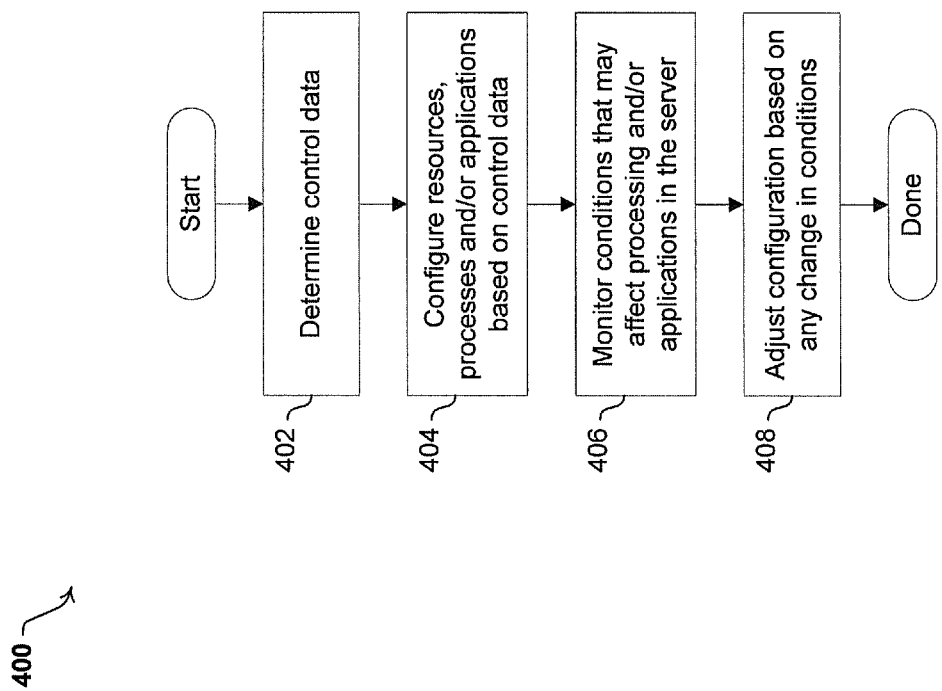
FIG. 4 is a flow chart that illustrates exemplary steps for configuring a support sever to service a plurality of set-top-boxes (STBs), in accordance with an embodiment of the invention.

FIG. 4 is a flow chart that illustrates exemplary steps for configuring a support sever to service a plurality of set-top-boxes (STBs), in accordance with an embodiment of the invention. Referring to FIG. 4, there is shown a flow chart 400 comprising a plurality of exemplary steps that may be performed to enable concurrent servicing of STBs by a support server.

In step 402, configuration-related data may be determined via a support server, such as the server 302. In step 404, resources, processes and/or applications of the server 302 may be configured based on the determined configuration-related data to enable and/or enhance concurrent servicing of the plurality of STBs 304a, 304b, . . . , 304n. In this regard, the server 302 may utilize, for example, time slicing and/or adaptive encoding processing to enable and/or to enhance resource sharing and/or load balancing during concurrent STB servicing operations. In step 406, the server 302 may continue to monitor conditions that may affect servicing of one or more of the STB. For example, the server 302 may monitor available bandwidth in each of the links 306a, 306b, . . . , 306n utilized to transmitted processed content to the STBs 304a, 304b, ..., 304n; and/or the links 312, ..., 322 utilized to retrieved at least some of the content from the web servers 310, ..., 320. In step 408, the server 302 may adjust its configuration based on any change in conditions that may be deemed to affect its concurrent STB servicing operations.

Various embodiments of the invention may comprise a method and system for providing dynamic time slice encoding for complete internet anywhere. The support server 302 may be used to handle at least some of processing of content retrieved via and/or based on, for example, web access operations in the plurality of STBs 304a, 304b, ..., 304n. Resource allocation and/or utilization, and/or tasks or applications performed in the support server 302 during the offloaded processing may be configured based on configuration related data, which may be determined by the support server 302, via the host processor 204 for example. The configuration related data may comprise capabilities of links 306a, 306b, ..., and 306n between the support server 302 and each of the plurality of STBs 304a, 304b, ..., 304n; requirements of the tasks necessary for performing the offloaded processing in the support server 302; characteristics of retrieved content and/or the web access operations; user preferences and/or interactions; and/or content provider preferences. Exemplary link capabilities may comprise bandwidth available during communication of processed content from the support server 302 to each of the STBs 304a, 304b, ..., 304n.

The offloaded processing may comprise converting content that is unsupported via the plurality of STBs 304a, 304b, ..., 304n, to supported content, comprising for example video, audio, and/or graphics content. In this regard, the supported content may then be accessed, utilized, and/or consumed using commonly available systems, tools, and/or application, such as, in the case of video content, a video codec. Configuring tasks and/or resources may comprise using, for example, scheduling algorithm, via the host processor 204 to provide time slicing based access to resources that are commonly used during concurrent servicing of at least some of the plurality of STBs 304a, 304b, ..., 304n by the support server 302. Furthermore, configuring tasks and/or resources may enable balancing load of the support server 302 during concurrent offloaded processing for at least some of the plurality of STBs 304a, 304b, ..., 304n based on capabilities of links 306a, 306b, ..., 306n between the support server 302 and each of the at least some of the plurality of STBs 304a, 304b, ..., 304n. The configuration may also be performed based on capacities and/or capabilities of links 312, ..., 322 between the support server 302 and the web servers 310, ..., 320, which are utilized to provide the retrieved content. The support server 302 may dynamically reconfigure the tasks and/or resources based on monitoring its operations and/or changes of the configuration related data.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for providing dynamic time slice encoding for complete internet anywhere.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
performing by one or more processors, one or more circuits, or any combination thereof in a server that is operable to handle processing of content for a plurality of set-top boxes (STBs), wherein the content is based on one or more Internet access operations by one or more of the plurality of STBs:
  determining control data that affects performing the processing of the content by the server;
  configuring, based at least in part on the determined control data and capabilities of one or more links between the server and one or more web servers utilized to support at least some of the one or more Internet access operations, one or more tasks handled or one or more resources used by the server during the processing of the content; and
  time slicing access to the one or more resources that are commonly used during concurrent servicing of at least some of the plurality of STBs by the server.

2. The method according to claim 1, wherein the control data comprises capabilities of one or more links between the server and each of the plurality of STBs, requirements of the tasks, characteristics of the content or the Internet access operations, user preferences or interactions, or content provider preferences.

3. The method according to claim 2, wherein the capabilities of said one or more links comprise available bandwidth during communication of processed content from the server to each of the plurality of STBs.

4. The method according to claim 1, wherein the processing of the content comprises converting content that is unsupported via the plurality of STBs to supported content.

5. The method according to claim 1, wherein the one or more commonly used resources comprise resources utilized by each of a plurality encoding sessions corresponding to processing performed for each of the least some of the plurality of STBs.

6. The method according to claim 1, comprising balancing load of the server during concurrent processing of the content for at least some of the plurality of STBs based on capabilities of links between the server and each of the at least some of the plurality of STBs.

7. The method according to claim 1, comprising dynamically reconfiguring the one or more tasks or the one or more resources based on monitoring operations of the server or changes of the control data.

8. The method according to claim 1, comprising communicating with one or more additional servers during performance of the processing of the content to combine resources of the server and the one or more additional servers for servicing the plurality of STBs.

9. A system for communication, the system comprising:
one or more processors, one or more circuits, or any combination thereof in a server that is operable to handle processing of content for a plurality of set-top boxes (STBs), wherein the content is based on one or more Internet access operations by one or more of said plurality of STBs;
wherein the processors or circuits are operable to determine control data that affects performing the processing of the content by the server;
wherein the processors or circuits are operable to configure, based at least in part on the determined control data and capabilities of one or more links between the server and one or more web servers utilized to support at least some of the one or more Internet access operations, one or more tasks handled or one or more resources used by the server during the processing of the content; and
wherein the processors or circuits are operable to time slice access to the one or more resources that are commonly used during concurrent servicing of at least some of the plurality of STBs by the server.

10. The system according to claim 9, wherein the control data comprises capabilities of one or more links between the server and each of the plurality of STBs, requirements of the tasks, characteristics of the content or the Internet access operations, user preferences or interactions, or content provider preferences.

11. The system according to claim 10, wherein the capabilities of the one or more links comprise available bandwidth during communication of processed content from the server to each of the plurality of STBs.

12. The system according to claim 9, wherein the processing of the content comprises converting content that is unsupported via the plurality of STBs to supported content.

13. The system according to claim 9, wherein the one or more commonly used resources comprise resources utilized by each of a plurality encoding sessions corresponding to processing performed for each of the least some of the plurality of STBs.

14. The system according to claim 9, wherein the one or more processors or circuits are operable to balance load of the server during concurrent processing of the content for at least some of the plurality of STBs based on capabilities of links between the server and each of the at least some of the plurality of STBs.

15. The system according to claim 9, wherein the one or more processors or circuits are operable to dynamically reconfigure the one or more tasks or the one or more resources based on monitoring operations of the server or changes of the control data.

16. The system according to claim 9, wherein the one or more processors or circuits are operable to communicate with one or more additional servers during performance of the processing of the content to combine resources of the server and the one or more additional servers for servicing the plurality of STBs.

17. A non-transitory computer-readable medium embodying a program executable in a computing device, the program configured to at least:
determining control data that affects performing a processing of content by the computing device, the content being based on one or more Internet access operations by one or more of a plurality of set-top boxes (STBs);
configuring, based at least in part on the determined control data and capabilities of one or more links between the computing device and one or more web servers utilized to support at least some of the one or more Internet access operations, one or more tasks handled or one or more resources used by the computing device during the processing of the content; and
time slicing access to the one or more resources that are commonly used during concurrent servicing of at least some of the plurality of STBs by the computing device.

18. The non-transitory computer-readable medium of claim 17, wherein the control data comprises capabilities of one or more links between the computing device and each of the plurality of STBs, requirements of the tasks, characteristics of the content or the Internet access operations, user preferences or interactions, or content provider preferences.

19. The non-transitory computer-readable medium of claim 18, wherein the capabilities of said one or more links comprise available bandwidth during communication of processed content from the computing device to each of the plurality of STBs.

20. The non-transitory computer-readable medium of claim 17, wherein the processing of the content comprises converting content that is unsupported via the plurality of STBs to supported content.

* * * * *